United States Patent [19]

Miura et al.

[11] Patent Number: 4,504,913
[45] Date of Patent: Mar. 12, 1985

[54] ELECTRONIC NAVIGATOR FOR AUTOMOTIVE VEHICLES

[75] Inventors: Kunio Miura, Okazaki; Koshi Hasebe, Anjo; Takashi Ono, Kariya; Kazushi Akutsu, Kariya; Shinji Ohyama, Kariya; Kazuaki Minami, Kariya, all of Japan

[73] Assignee: Nippondenso Co., Ltd., Kariya, Japan

[21] Appl. No.: 386,094

[22] Filed: Jun. 7, 1982

[30] Foreign Application Priority Data

Jun. 8, 1981 [JP] Japan .................. 56-87714

[51] Int. Cl.³ .................. G06F 15/50; G09B 29/10
[52] U.S. Cl. .................. 364/449; 364/424;
364/521; 364/571; 353/12; 343/451; 340/990;
340/995; 73/178 R
[58] Field of Search .............. 364/424, 443, 444, 449,
364/521, 571; 353/11, 12; 343/450-453; 73/178
R; 340/988-990, 992, 995, 996, 709, 711, 731

[56] References Cited

U.S. PATENT DOCUMENTS

| 4,086,632 | 4/1978 | Lions | 343/451 |
| 4,139,889 | 2/1979 | Ingels | 340/995 |
| 4,253,150 | 2/1981 | Scovill | 364/449 |
| 4,312,577 | 1/1982 | Fitzgerald | 340/995 |
| 4,366,475 | 12/1982 | Kishi et al. | 364/521 |
| 4,400,780 | 8/1983 | Nagao et al. | 364/521 |

FOREIGN PATENT DOCUMENTS

55-159299 12/1980 Japan .

Primary Examiner—Gary Chin
Attorney, Agent, or Firm—Cushman, Darby & Cushman

[57] ABSTRACT

An automotive navigator using a microcomputer displays a car position by a cursor on a road map displayed on a CRT screen. The navigator uses a cassette tape which stores a plurality of road map data and several kinds of reduced map data and expanded map data. It also uses a group of manual switches including a switch for changing the displayed area, a switch for selecting an expanded map or reduced map and a switch for moving the cursor position. Necessary data are displayed on the screen by the state of each switch. A region corresponding to the cursor position is displayed by the expanded map.

5 Claims, 11 Drawing Figures

ELECTRONIC NAVIGATOR FOR AUTOMOTIVE VEHICLES

This invention relates to a navigator which displays a road map on a display apparatus in the car in order to assist a driver unfamiliar with an area.

Usually, in the case of driving in an unfamiliar area, one looks at a road map in order to confirm the present position by the layout of the roads and guide posts. Furthermore, it is necessary, while driving, to consider the direction and the route to one's destination. These series of actions are very troublesome.

As a method for solving this problem, a Japanese Laid-Open Patent specification No. 55-159229 "Position display apparatus for car driving" is known, in which with the provision of a distance sensor for detecting the drive distance of the car and a direction sensor for detecting the driving direction of the car and the position of the driving car is displayed on a display apparatus.

However, the display of the road map is done by interchanging transparent films on which the road map of the driving area is printed. When a particular road map is being displayed, if one wants to change the map to another one with a different scale, a problem of complicated manipulation arises.

This invention is intended to solve this problem by storing map data for display of a particular road map as well as map data with different scales related to this particular road map in a memory. If an alteration of the map scale is required, map data for a road map with a different scale from that of the map under display are read out from the memory, to display the desired map on the display apparatus. In this way, this invention aims to provide a car navigator capable of switching the data on a particular road map to other data with a different scale related to the particular road map and displaying this switched map in an easy way.

Further objects, features and advantages of the present invention will be described hereinafter with reference to the accompanying drawings, in which.

Figure 1:
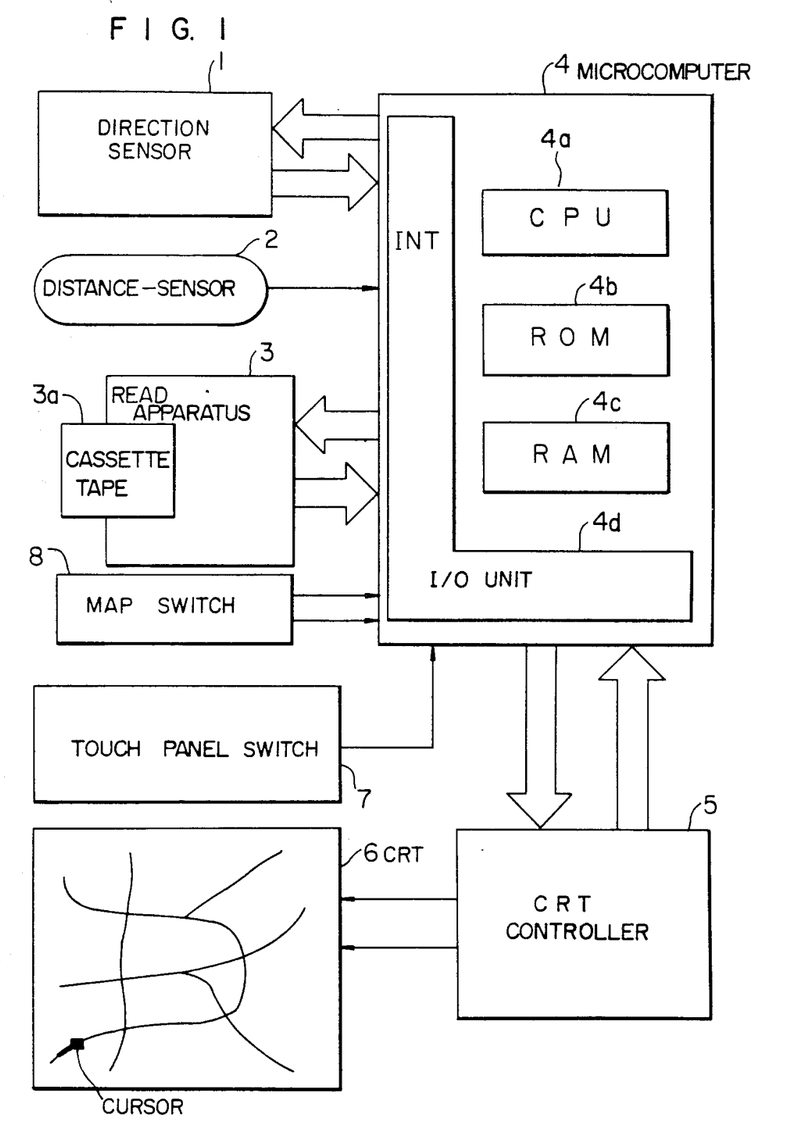
FIG. 1 is a whole block diagram showing one embodiment of this invention.

In FIG. 1, a reference numeral 1 denotes a direction detecting apparatus as a means for detecting an advancing direction of an automotive vehicle, which comprises a direction-sensor for detecting X and Y components of the earth's magnetic field in response to the driving direction of the car and an A/D converter for converting a signal from this direction-sensor to a digital signal, and generating digital signals of X and Y components corresponding to the driving direction of the car. 2 is a distance-sensor as a means for detecting the distance, which generates a distance-pulse for each unit of drive distance (for example about 39.2 cm). 3 is a read apparatus or tape recorder which searches the map data on a particular area from a cassette tape 3a, which is a memory means for storing the map data on plural areas (containing also data of absolute coordinates of a top right point of each map), and reads them out.

Reference numeral 4 is a microcomputer for executing the digital operation process of software in accordance with a pre-determined control program, comprising a CPU 4a, a ROM 4b, a RAM 4c and an I/0 unit 4d. The microcomputer is turned on by the supply of a stabilized voltage from a stabilized power supply circuit (not shown) which receives a power supply from a car battery and generates a stabilized voltage of 5 V. The microcomputer executes the operation processes by receiving digital signals of X- and Y-components from the direction detecting apparatus 1, a distance-pulse from the distance sensor 2 and a read signal from the read apparatus 3, and generates display signals for displaying the map of a particular area and information on the driving route. The RAM 4c is always backed up by a power supply from the battery.

5 is a cathode ray tube (hereinafter referred to as CRT) controller which receives display signals from the microcomputer 4 to store the driving route information and individual character data, and displays the stored map data and the driving route information, or the character data, on the CRT display. 6 is a CRT display apparatus which displays a map of a particular area and a driving route, or characters, on the CRT by image- and synchronization-signals from the CRT controller 5. 7 is a touch panel switch which is mounted on the display surface of the CRT display apparatus and generates a serial signal corresponding to a particular touched area of 12-division touch areas in response to the touch operation of this area. 8 is a map switch as an alteration means which is provided with two switches (expansion switch and reduction switch) for changing a map under display on the CRT display apparatus to another map with a different scale. The read apparatus 3, the microcomputer 4 and the CRT controller constitute a control means.

Figure 2:
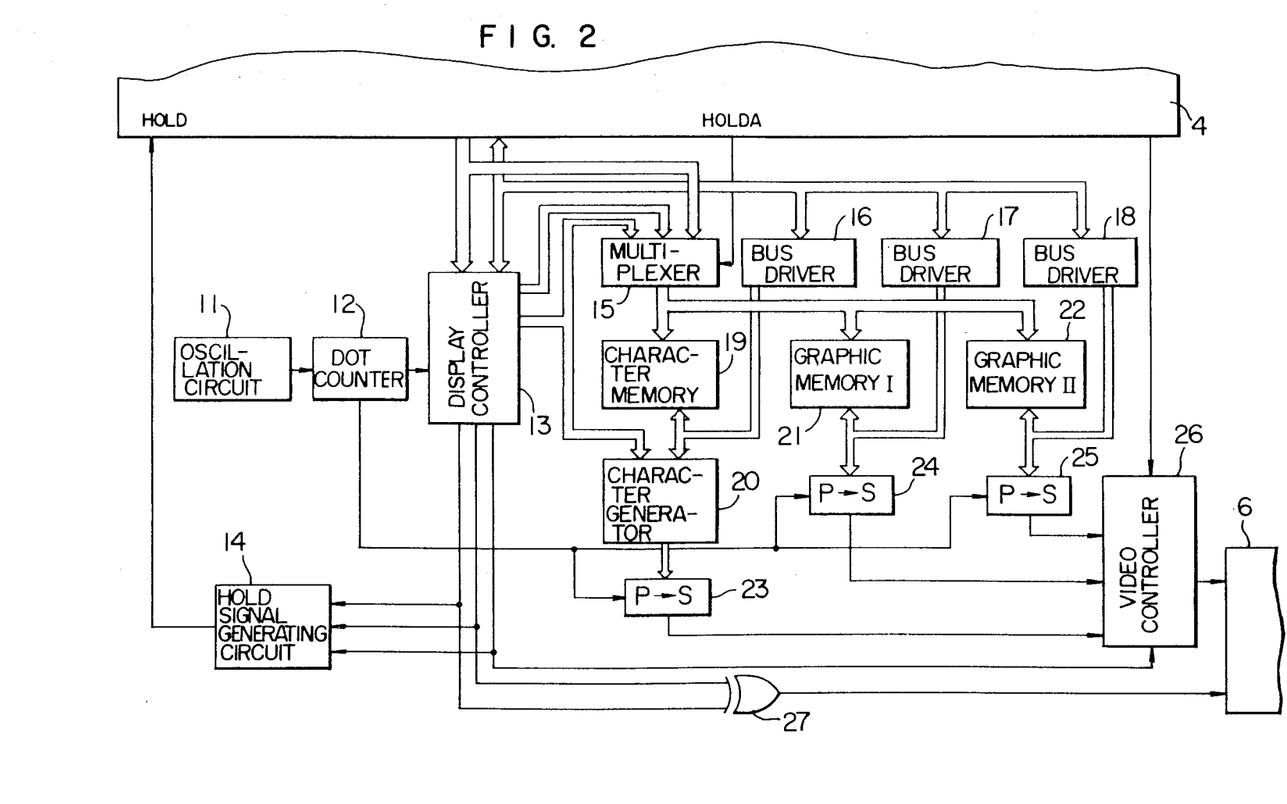
FIG. 2 is a detailed circuit block diagram of a CRT controller in FIG. 1.

Next, explanation will be made of a detailed circuit diagram of the above CRT controller 5 shown in FIG. 2, where 11 is an oscillation circuit for generating an oscillation signal of 12.096 MHz. 12 is a dot counter which frequency divides the oscillation signal from the oscillation circuit 11 and generates a dot timing clock of 6.048 MHz and a character timing clock of 796 kHz. 13 is a display controller which generates a horizontal-vertical synchronization signal, a display timing signal, a refresh memory address signal and a raster address signal by a command from the microcomputer 4 and the character timing clock from the dot counter 12. 14 is a hold signal generating circuit which supplies a hold signal for holding the microcomputer 4 in the display period to a hold terminal of the computer 4 in response to the horizontal-vertical synchronization signal from the display controller 13. 15 is a multiplexer which switches the address signal from the microcomputer 4 as well as the refresh memory address signals and the raster address signals from the display controller 13 by a hold-acknowledge (HOLDA) signal from the microcomputer 4. 16, 17 and 18 are bus drivers having a tri-state for switching the direction data between the microcomputer 4 and the display memory. 19 is a character memory which stores the display data of ASCII code etc. from the microcomputer 4, receives the refresh memory address signal from the display controller 13 and generates the content as an address. 20 is a character generator which generates a display pattern by a display address from the character memory 19 and the raster address signal from the display controller 13. 21 is a first graphic memory which stores the map data from the microcomputer 4. 22 is a second graphic memory which stores the driving route information (the driving locus data and the present position data) from the microcomputer 4. 23, 24 and 25 are parallel-serial (P→S) converters which convert parallel signals from the character generator 20 and the first and second graphic memories 21 and 22 into serial data by the dot timing clock. 26 is a video controller which switches the signals from the P→S converters 23, 24 and 25 in order to select a graphic and a character image by an image switching signal from the microcomputer 4 and generates an image signal by a display timing signal from the display controller 13. 27 is an exclusive-or circuit which generates a synchronization signal by the horizontal-vertical synchronization signal from the display controller 13. The character memory, and the first and second graphic memories are always backed up by a power supply from the battery.

The CRT controller 5 generates an image signal and a synchronization signal for the CRT display apparatus for the following purposes. That is, the character data are stored in the character memory 19; the map data are stored in the first graphic memory 21; and the display data of drive locus and present position are stored in the second graphic memory by the data sent out from the microcomputer 4. The graphic image (for displaying the drive locus and the present position) and the character image (for displaying characters to indicate the area) are selected out by an image switching signal from the microcomputer 4. Images in accordance with this selection are displayed on the CRT display 6.

Figure 3:
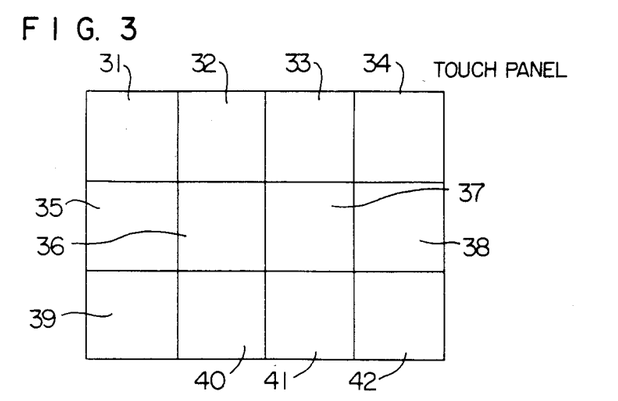
FIG. 3 is an explanatory view of the touch areas of a touch panel of FIG. 3.

The touch panel 7 has such 12-divided touch areas 31 to 42 as shown in FIG. 3, and is constituted with two sheets of glass and a transparent electric conductive film forming a matrix in the glass sheets. When a particular touch area is pushed, the electric conductive film makes contact with the glass due to deformation of the glass sheet so that the touch area can be detected. Thus, a serial signal (composed of a start signal and a touch information signal) corresponding to the touched area and detected by a touch signal generation circuit (not shown) is generated. This touch signal generation circuit generates the touch information as a serial signal for every 40 msec.

Figures 4A, 4B:
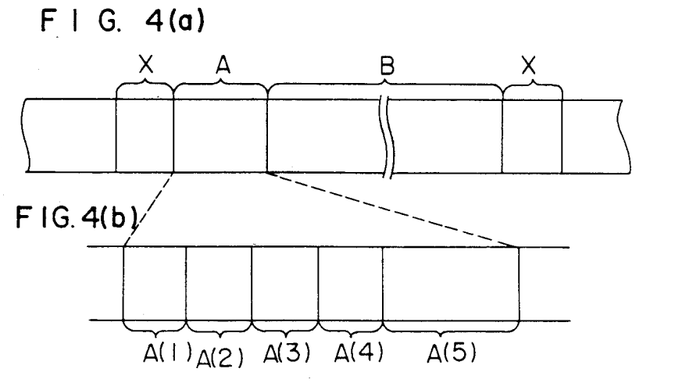
FIG. 4(a) and 4(b) are explanatory views showing the data regions of a cassette tape.

FIG. 4(a) shows a data part corresponding to one area in the casette tape 3a. A is a header part which comprises, as shown in FIG. 4(b), a map number A(1), an absolute coordinate data part A(2) on the top right point of the map (a coordinate corresponding to the north pole), a distance scale A(3) for one picture element when the map is displayed on CRT, a map number A(4) of another map having a reduced scale and containing the above map, and a map number A(5) of a map having an expanded scale and displaying a particular area of the above map. The map number data A(5) of the enlarged map has such a format as can be selected by the position of a cursor on the image surface of the CRT. (For example, the image surface may be divided into four sections and an area of the position of the cursor may be displayed in a twice expanded map.) B denotes a map data part in which the map data on the area are stored, and X denotes a blank part. Thus, when the read apparatus 3 reads these A and B parts, the map data on the particular area, the absolute coordinate, the scale and the map numbers of the maps with a different scale for this particular area can be obtained.

Figure 6:
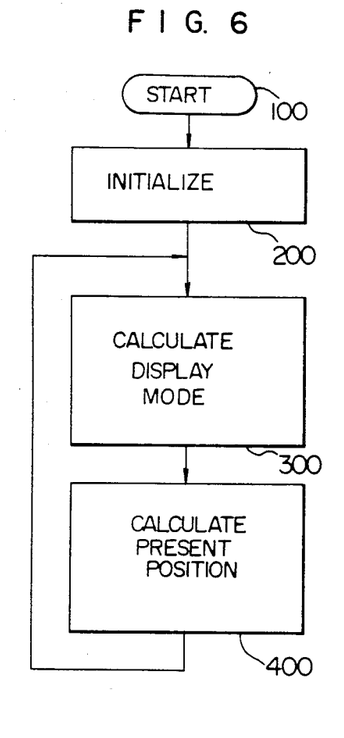
FIG. 6 is a flow chart of operation showing the whole operation processes of a main routine of a microcomputer.
Figure 7:
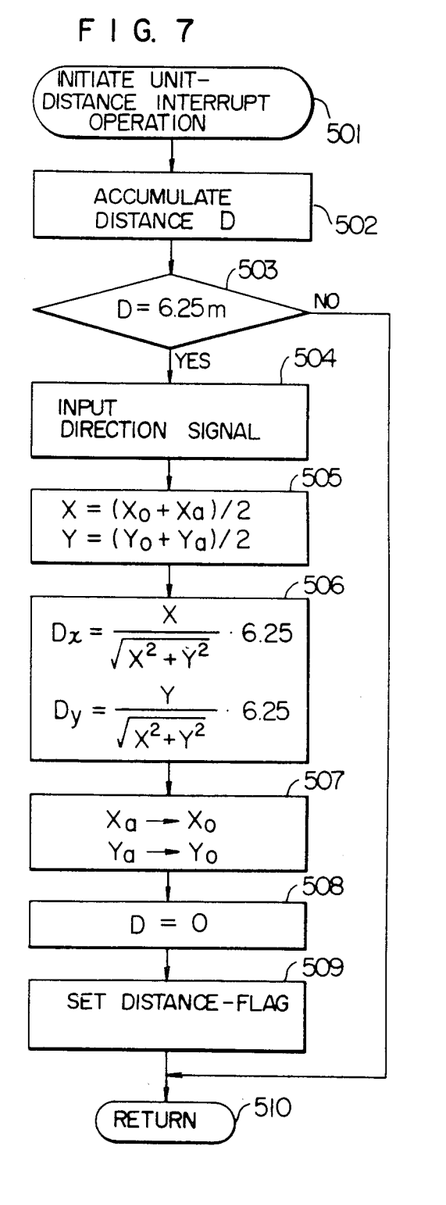
FIG. 7 is a flow chart of operation showing a routine of interruption operation by a distance-pulse from a distance-sensor.
Figure 8:
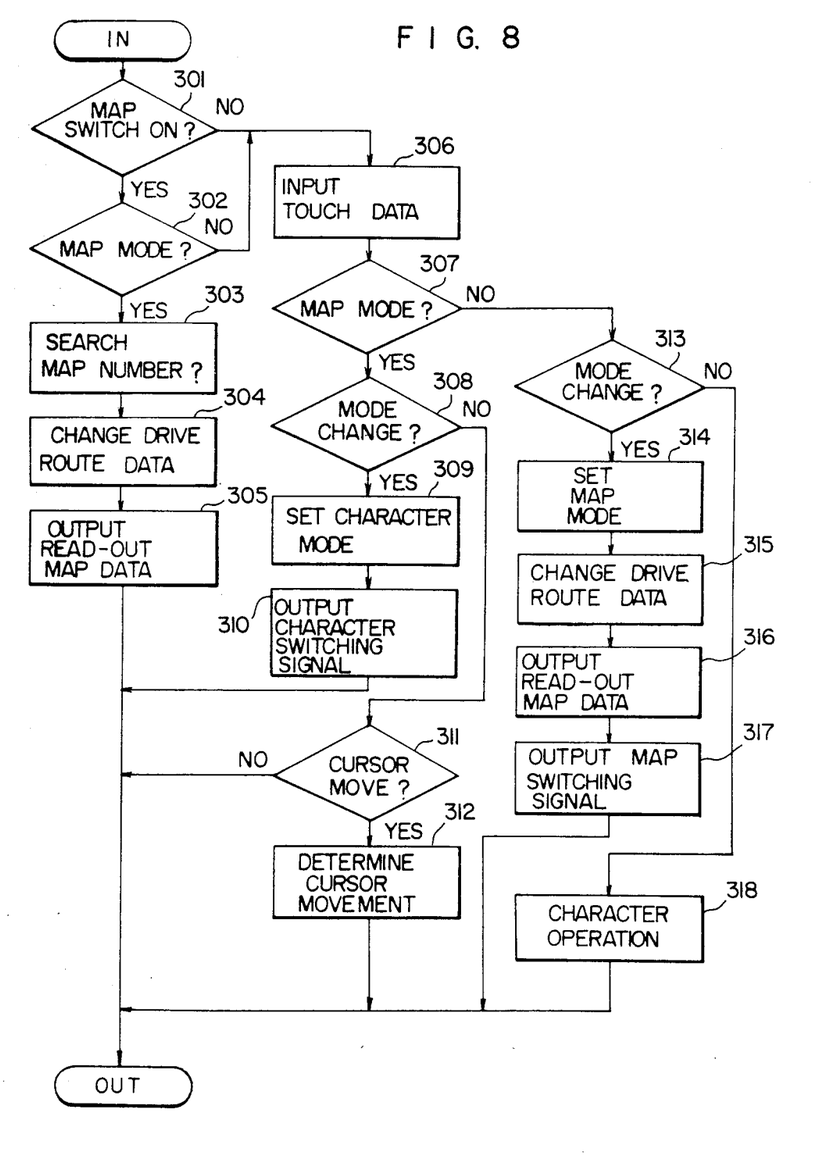
FIG. 8 is a flow chart of operation showing detailed operation processes of the mode operation routine of FIG. 6.
Figures 9, 10:
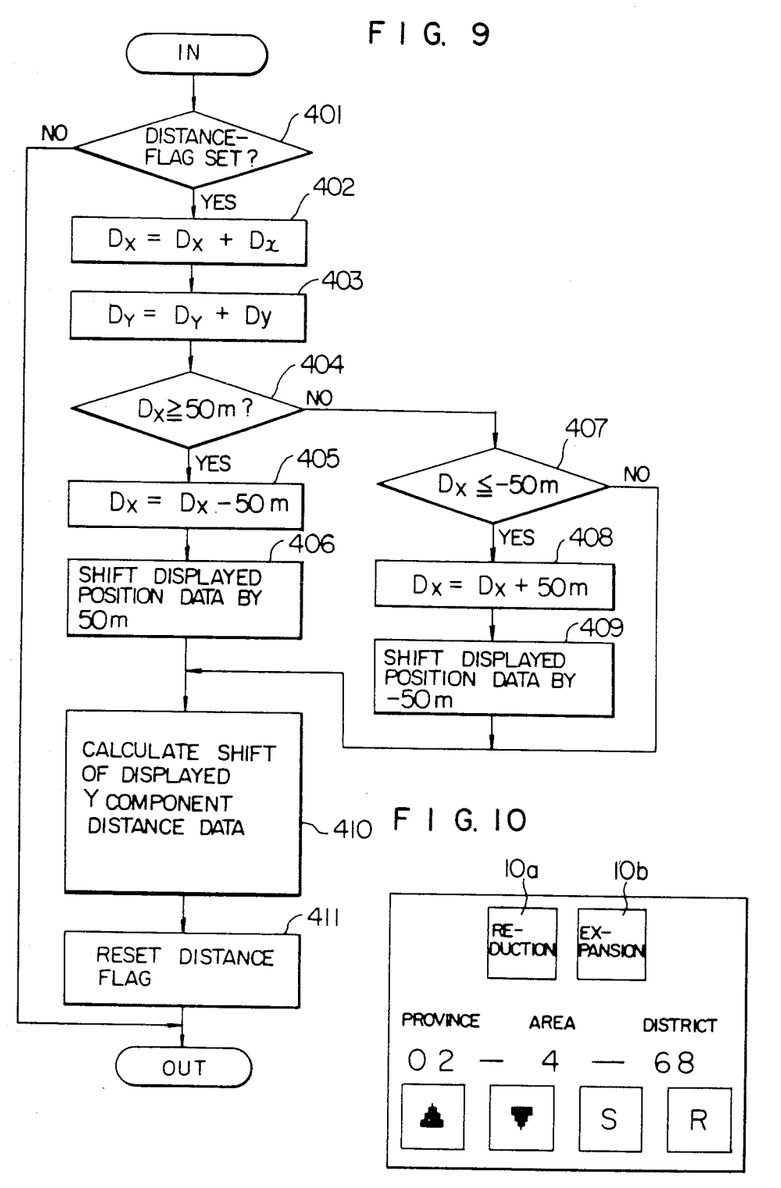
FIG. 9 is a flow chart of operation showing detailed operation processes of calculating the present position.
FIG. 10 is an explanatory diagram of a display according to another embodiment of this invention.

The operation of the above described exemplary embodiment of the present invention will be explained with reference to an explanatory view of the display, shown in FIG. 5, and flow charts of operation, shown in FIGS. 6 to 9. FIG. 6 is a flow chart showing the whole operation processes of the main routine of the microcomputer 4. FIG. 7 is a flow chart showing the interruption operation processes due to a distance-pulse from the distance-sensor 2. FIG. 8 is a flow chart showing the detail of the mode operation process in FIG. 6. FIG. 9 shows a detail of the operation processes for calculating the present position.

Now, consider a car provided with the elements 1 to 7 as shown in FIG. 1. When a key switch is made on at the start of driving, each electric system is turned on by the battery. The microcomputer 4 begins to operate by the supply of a stabilized voltage from a stabilized power supply circuit. The operation process starts with a start step 100 of FIG. 6. In a following initial state setting step 200, registers, counters and latches of the microcomputer 4 are set at an initial state necessary for the start of operation processes. After this initial state setting step, the mode operation routine 300 and the present position calculation routine 400 are executed in a period of several tens msec repeatedly.

In the mode operation routine 300, either a map mode or a character mode is selected and the content corresponding to each mode is displayed on the CRT. In the case of map mode, movement of a cursor for indicating the present position and switching of a map by the map switch 8 are enabled. In the case of character mode, an operation for designating a map of a particular area is executed. In the following present position calculation routine 400, the contents of the present position data in the second graphic memory 2 and the X- and Y-components of the drive locus data in the CRT controller 5 are altered for each driving distance of ±50 m. Then, the process returns to the mode operation routine 300. The operation processes of the mode operation routine 300 and the present position calculation routine 400 are repeated in a period of several tens msec.

In this repeated operations of the main routine, if a distance-pulse from the distance-sensor 2 is applied to the interruption terminal (INT) of the microcomputer 4, the computer stops the operation processes of the main routine for a while and executes the interruption operation processes shown in FIG. 7. The operation starts with an interruption start step 501 and proceeds to an accumulation step 502, where data of a unit distance (corresponding to about 39.2 cm) are added to the distance-data D stored in RAM 4c and renews the content. In a following distance judging step 503, it is judged whether the distance data D reached 6.25 m. If the distance-data D indicates a value below 6.25 m, due to the judgement NO, the process jumps to a return step 510. If the distance data D indicates a value above 6.25 m, due to the judgement YES, the process goes to the following direction signal input step 504, where X- and Y-component signals Xa and Ya (the east and north directions are positive while the west and south directions are negative) from the direction detection apparatus 1 are introduced. In a next average direction calculation step 505, the average direction data X and Y are calculated from the previous direction data Xo and Yo (direction data before the drive distance of 6.25 m) and the present direction data Xa and Ya. In a next distance component calculation step 506, the distance components Dx and Dy in the X- and Y-directions are calculated as $X/\sqrt{X^2+Y^2} \cdot 625$ and $Y/\sqrt{X^2+Y^2} \cdot 625$, respectively ($X/\sqrt{X^2+Y^2}$ and $Y/\sqrt{X^2+Y^2}$ correspond to $\cos\theta$ and $\sin\theta$ respectively, where $\theta$ is an angle rotated anti-clock wise from the east direction). In a next memory step 507, the present direction data Xa and Ya are stored as Xo and Yo respectively for the next process. In a next distance-data reset step 508, the distance-data D are reset to O. In a next distance-flag set step 509, the distance-flag is set. In the return step 10, the process returns to the interrupted main routine. That is, in this interruption routine, the distance-data D are accumulated and renewed for every unit drive distance. When the distance-data D reach 6.25 m, the distance components $D_x$ and $D_y$ in X- and Y-directions at this time are calculated and the distance-flag is set.

Next, explanation will be made of the detailed operation processes of the mode operation routine 300, which starts with a map switch judging step 301 of FIG. 8. When either a switch for expansion or a switch for reduction in the map switch 8 is pushed, the judgement becomes YES. In a next map mode judging step 302, it is judged whether the content of the mode area in RAM 4c is a map mode or not. If it is the case, the judgement becomes YES. Then, in a next map number search step 303, a map number, which should be switched in accordance with the header part data and the cursor position data corresponding to a map data under display, is obtained. In the following switching step 304 for the driving route data, the driving route data in the second graphic memory 22 in the CRT controller 5 are changed. In this case, first the read apparatus 3 is controlled to search a cassette tape position corresponding to the map number obtained in the previous step and to read the header part. The value of coordinate conversion is calculated from the absolute coordinate and the scale of both the present and the previous maps. In accordance with the calculated value, the data on the driving locus and the present position in the second graphic memory 22 are updated. In a next map data read-out step 305, the map data in the cassette tape 3a is introduced through the read apparatus 3, and the map data are generated in the first graphic memory. The first operation process of the mode operation routine 300 is thus finished. If it is desired to change the present map view to a reduced map containing the area, one should push a switch for reduction. If one wants to have an enlarged map showing a part of the area under display, one should adjust the cursor on the position to be enlarged and then push a switch for expansion. In this way, automatic map switching and its display on the CRT display apparatus 6 is obtained.

On the other hand, if the judgements in the map switch judging step 301 and the map mode judging step 302 are NO, the process goes to a touch data input step 306 where touch data from the touch panel switch 7 are introduced and stored in RAM 4c. Then, in a next map mode step 307, it is judged whether the content of the mode area in RAM 4c is a map mode or not. If this is the case, the judgement becomes YES, and the process moves to a mode alteration judging step 308 where it is judged whether the touch data stored in RAM 4c are those data indicative of a mode alteration (i.e. the data obtained by pushing the touch area 34 in FIG. 3). If this is the case, the judgement becomes YES, and the process moves to a character mode setting step 309 where the content of the above mode area is set in the character mode. In a next character switching signal output step 310, a character switching signal for displaying a character image on the CRT display apparatus 6 is generated in the video controller of the CRT controller 5. Thus, the first operation process of the mode operation routine 300 is finished.

If the touch data are not the data indicative of a mode alteration but the data when another area than the area 34 in FIG. 3 is pushed or when no touch area is pushed (e.g. data of FF), the judgement of the mode alteration judging step 308 becomes NO, and the process moves to a cursor movement judging step 311, where it is judged whether any one of the areas 32, 33, 35, 38, 40 and 41 is pushed (whether the data are those for cursor movement). If the data are not those for cursor movement, the judgement becomes NO. Thus, the first operation process of this mode operation routine 300 is finished. If the touch data are those for cursor movement, the judgement becomes YES, and the process moves to a cursor movement operation step 312, where, in accordance with the touch data, if the data are due to a push on the touch area 32 or 33, the content of the second graphic memory 22 in the CRT controller 5 is altered in such a manner that the cursor of the present position under display on the CRT apparatus 6 is moved by a prescribed distance in the north direction. Similarly, if the touch data are due to a push on the touch area 35, the cursor is moved in the west direction by a prescribed distance, if the touch data are due to a push on the touch area 40 or 41, the cursor is moved in the south direction by a prescribed distance. If the touch data are due to a push on the touch area 38, the cursor is moved in the east direction by a prescribed distance. Thus, the first operation process of this mode operation routine is finished.

On the other hand, if the judgement of the map mode judging step 307 is NO, the process moves to a mode alteration step 313, where through the same operation process as in the above-mentioned mode alteration judging step 308 it is judged whether a mode alteration is required or not. If the judgement is YES, the process moves to a map mode setting step 314 where the content of the mode area in the RAM 4c is set to the map mode. In a next driving route data conversion step 315, the data on the driving route in the second graphic memory 22 of the CRT controller are changed. In this case, first the read apparatus 3 is controlled to search a specified area from the map numbers. Then, the value for the coordinate conversion is calculated from the absolute coordinate and the scale (stored in the header part A in FIG. 4(a)) of the map for the area under search and from those of the previous area. In accordance with the calculated value, the data of the drive locus and the present position in the second graphic memory 22 are converted and slid. In the following map data read-out step 316, the map data in the cassette tape 3a are introduced through the read apparatus 3 and sent to the first graphic memory 21. In a next map switching signal output step 317, a map switching signal for displaying a graphic image of a map on the CRT display apparatus 6 is generated in the video controller 26. The first operation process of the mode operation routine 300 is thus finished. In order to switch the character image to a graphic image of a different map from the previous one, the abovedescribed operation processes are executed, whereby the present map data are stored in the first graphic memory 21 and the content of the second graphic memory 22 is converted in such a manner that the cursor indicating the drive locus and the present position is moved to the present map area. Therefore, even if a map displayed on the CRT apparatus 6 is varied, the drive locus and the present position can be displayed on an appropriate part of the map.

If the judgement of the mode alteration judging step 313 is NO, the process moves to the character operation step 318. Before this step 318 is reached, a character mode has been already set. Since the character switching signal is being sent to the video controller 26, the CRT display apparatus 6 displays such character images as shown in FIG. 5. The numeral 02-4-68 specifies a province, an area and a district, respectively. Each number is added by 1 and renewed by a switch 51, subtracted by 1 and renewed by a switch 52, set by a set switch 53 and reset by a reset switch 54. This is operated in the character operation step 318. The numerical data on the province, the area and the district, i.e. the map numbers, are stored in RAM 4c. The above-mentioned switches 51, 52, 53 and 54 correspond to touch areas 39, 40, 41, and 42 in FIG. 3, respectively.

In the mode operation routine 300 shown in FIG. 8, the following operations are performed in accordance with the switch signal from the map switch 8, touch data from the touch panel switch 7 and the content of mode area in RAM 4c.

(1) In the case of the map mode, if there is an indication of map switching, the display of the map is switched either to a reduced or to an enlarged map.

(2) In the case without indication of map switching and alteration of map mode, if there is an indication of cursor movement, an operation process for this is executed while if there is no indication of cursor movement the map is continuously displayed.

(3) In the case without indication of map switching but with an indication of mode alteration, the map mode is changed to the character mode, and the character image is displayed on the CRT display apparatus 6.

Figure 5:
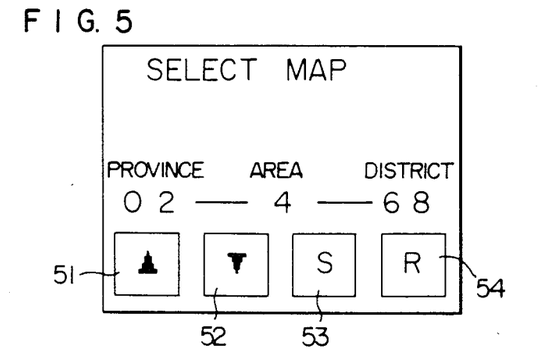
FIG. 5 is an explanatory view showing a display state of the CRT display apparatus.

(4) In the case of character mode without indication of map switching and mode alteration, an alteration of a map is accepted for such character images as shown in FIG. 5.

(5) In the case of character mode without indication of map switching, if there is an indication of mode alteration, the character mode is altered to a map mode and a graphic image of the map is displayed on the CRT display apparatus 6. At the same time, drive locus and present position are displayed modified.

Next, explanation of the detailed operation processes of the present position calculation routine 400 in the main routine will be explained. This routine starts with a distance-flag judging step 401 of FIG. 9. It is judged here whether the distance-flag is set in the interruption operation process of FIG. 7. If the distance-flag is not set, the judgement becomes NO and the first operation process of the present position calculation routine 400 is finished. If the distance-flag is set, the judgement is YES and the process moves to the following X-distance correction step 402. In this step 402, the X-distance data DX are corrected by the X-distance component Dx through the interruption operation process (DX = DX + Dx). In a Y-distance correction step 403, the Y-distance data DY is corrected in a similar manner (DY = DY + Dy). In the following X-distance judging step 404, it is judged whether the X-distance data DX reached a value larger than or equal to 50 m. In this case, if the X-distance data DX has a value larger than or equal to 50 m, the judgement becomes YES and the process moves to an X-distance subtraction step 405. Here, a value of 50 m is subtracted from the X-distance data DX. Then, in the following display movement step 406, the present position data in the second graphic memory 22 is moved in the positive direction (east direction) by a unit of 50 m and the data on the drive locus is made to follow this movement.

If the judgement of the first X-distance judging step 404 is NO, the process goes to the second X-distance judging step 407, where it is judged whether the X-distance data DX is less than or equal to −50 m. If this is the case, the judgement becomes YES. In a next X-distance addition step 408, a value of 50 m is added to the X-distance data DX. Then, in a next display movement step 409, the present position data in the second graphic memory 22 is moved in the negative direction (west direction). The drive locus data is made to follow this movement.

If the judgement of the second X-distance judging step 407 is NO, the process moves to a Y-component display movement process routine 410. After the display movement steps 406 and 409, the process goes also to this routine 410, where similar judging and operation processes as in the above steps 404 to 409 is done for the Y-distance data DY calculated in the Y-distance correction step 403. (If the absolute value of the Y-distance data DY becomes larger than or equal to a value of 50 m, the present position data and the drive locus data in the second graphic memory 22 is moved in the corresponding direction by a unit of 50 m. Then, in a next distance-flag reset step 411, the distance-flag is reset.

In summary, in the present position calculation routine 400 shown in FIG. 9, the present position data and the drive locus data in the second graphic memory 22 are converted without regard to the images displayed in the CRT display apparatus 6.

Therefore, by the repetition of the main routine consisting of the mode operation routine 300 and the present position calculation routine 400 and by the interruption operation of FIG. 7, the present position data and the drive locus data in the second graphic memory 22 are sequentially altered. The image of the CRT display apparatus 6 is selected in accordance with a specified mode. In the case of a map mode, a graphic image of a map is displayed (including the display of the present position and the drive locus). In the case of a character mode, a character image for a specific map as shown in FIG. 5 is displayed.

Although the above-described embodiment is constituted with the touch panel switch 7 mounted on the display panel of the CRT display apparatus and the map switch 8 mounted separately, the both parts may be constituted with push buttons of matrix type with the same structure. Furthermore, the map switch 8 may be omitted and the character images of FIG. 5 may be constructed as shown in FIG. 10 in such a manner that a switch 10a for reduction and a switch 10b for expansion are provided. The operation processes from the map switching judging step 301 to the map data readout step 305 may be executed in the character operation step 318.

Although, in the above embodiment, the numbers of a reduced map and an expanded map are stored in each header part A of the cassette tape 3*a* as the reduced map number A(4) and the expanded map number A(5), this is not necessary since it can be arranged in such a manner that both the reduced map number and the enlarged map number can be calculated from the map number of a map under display.

Furthermore, although the map switch 8 is provided as a means for alteration, a voice recognizing apparatus may be used in which the indication of alteration by the voice of a driver, etc. is detected and thereby a signal for expansion or reduction is generated.

As described above, according to this invention, map data for a particular road map and other map data for this road map with different scales are stored in a memory. If an indication of altering the scale of the map for the road map under display is given by some alteration means, map data of the road map with a different scale is read out from the above memory means, and displayed on a display apparatus. By this constitution, the invention has an excellent effect to facilitate switching a map to another map with a different scale and displaying it automatically by an indication of alteration using some alteration means.

We claim:

1. A navigator for automotive vehicles comprising:

distance detection means for detecting the running distance of the vehicle;

direction detection means for detecting the running direction of the vehicle;

operation means responsive to detection signals from said distance detection means and said direction detection means for calculating a present position of the vehicle;

display means for electronically displaying a road map and the present position of the vehicle on the road map;

present position display control means for providing a control signal to said display means to display the present position of the vehicle calculated by said operation means;

memory means for storing a first map data for displaying a particular road map and a first scale data indicating a scale of the particular road map, and for storing a second map data indicative of another road map having a scale different from that of the particular road map and a second scale data indicating a scale of said another road map;

alternation means for generating alternation commands to allow said display means to display said another road map instead of the particular road map displayed on said display means;

map display control means for reading the first map data from said memory means to allow said display means to display said particular road map, and responsive to the alternation commands of said alternation means for reading the second map data from said memory means to allow said display means to display said another road map of the different scale instead of the previous road map; and present position calibration means responsive to the changing operation of the road map of said map display control means for calibrating the present position of the vehicle displayed on said display means in accordance with the first scale data and the second scale data stored in said memory means.

2. A navigator according to claim 1 wherein:

said memory means stores first map numeral data indicating the numerals of respective areas which are obtained by dividing the road map into a plurality of areas, map data indicative of the road map corresponding to said respective areas, scale data indicative of the road map corresponding to said respective areas, coordinate data indicating the position of said respective areas relative to a reference point in the form of a coordinate, and second map numeral data indicating numerals of areas each having a scale different from that of said respective areas;

said map display control means is responsive to the alternation commands of said alternation means for reading the map data stored correspondingly to the map numeral from said memory means in accordance with the map numeral indicative of the area with the different scale stored in said memory means and for allowing said display means to display the road map of the different scale instead of the previous road map; and said present position calibration means is responsive to the changing operation of the road map of said map display control means to calibrate the present position of the vehicle displayed on said display means by converting the coordinate of the road map in accordance with the scale data and the coordinate data stored in said memory means corresponding to the map numeral of the area of the different scale, and the scale data and the coordinate data indicative of the previous area displayed prior to the changing operation of said map display control means.

3. A navigator according to claim 1 wherein said memory means stores, as the map numerals of the area with the different scale relative to the previous area, the map numeral of an enlarged area having a larger scale than the previous area and the map numeral of a reduced area having a smaller scale than the previous area;

said alternation means generates alternation commands for enlargement or reduction; and said map display control means is responsive to the enlargement or reduction alternation command of said alternation means to read the map data corresponding to the map numeral of the enlarged or reduced area from said memory means and to allow said display means to display the road map of the enlarged or reduced area.

4. A navigator according to claim 2 wherein:

said memory means stores as the map numeral of the enlarged area with the larger scale than the previous area, a plurality of map numerals of the enlarged areas enlarged relative to the respective areas obtained by dividing the previous area into a plurality of areas;

said display means displays the present position of the vehicle by means of a cursor; and said map display control means is responsive to the generation of the enlargement command of said alternation means to select the map numerals of the enlarged area corresponding to the area at which said cursor is positioned out of said plurality of areas obtained by dividing the presently displayed areas to read the map data of the selected map numeral from said memory means and to allow said display means to display the road map of the enlarged area.

5. A navigator according to claim 3 further comprising means for permitting free movement of said cursor on a display surface of said display means.

* * * * *